United States Patent [19]
McClain

[11] Patent Number: 5,462,089
[45] Date of Patent: Oct. 31, 1995

[54] SHEET METAL DUCT CONSTRUCTION PROVIDING PRELIMINARY SUPPORT FOR CORNER CRIMPING

[75] Inventor: Lamont R. McClain, St. Louis, Mo.

[73] Assignee: Engel Industries, Inc., St. Louis, Mo.

[21] Appl. No.: 327,565

[22] Filed: Oct. 24, 1994

Related U.S. Application Data

[63] Continuation-in-part of Ser. No. 126,491, Sep. 24, 1993, Pat. No. 5,358,013.

[51] Int. Cl.[6] .............................. F16L 23/00; F16L 25/00
[52] U.S. Cl. ......................... 138/109; 138/155; 138/120; 138/DIG. 4; 285/405; 285/363
[58] Field of Search ................................... 138/109, 155, 138/120, DIG. 4, DIG. 10, 177, 178; 285/405, 406, 424, 332, 334.5, 363

[56] References Cited

U.S. PATENT DOCUMENTS

| | | | |
|---|---|---|---|
| 641,580 | 1/1900 | Cummins | 285/406 X |
| 2,260,221 | 10/1941 | Gray | 138/DIG. 4 X |
| 2,752,950 | 7/1956 | Coulters | 285/406 |
| 4,218,079 | 8/1980 | Arnoldt | 285/363 X |
| 4,351,390 | 9/1982 | Argyle et al. | 285/364 X |
| 4,447,079 | 5/1984 | Sullivan | 285/363 |
| 4,466,641 | 8/1984 | Heilman et al. | 285/406 |
| 4,579,375 | 4/1986 | Fischer et al. | 285/363 |
| 4,739,802 | 4/1988 | Meinig | 138/DIG. 10 X |
| 4,865,365 | 9/1989 | Meinig | 138/109 X |
| 5,103,872 | 4/1992 | Jyh-Long | 138/155 X |

OTHER PUBLICATIONS

DW/141 Specification for sheet metal ductwork, p. 20, FIG. 76 Iowa Precision–"Install T.D.C. Corners The Easy Way" advertisement.
Engel Industries, Inc. v. The Lockformer Company, et al., "Findings of Fact and Conclusions", entered Jul. 21, 1994, Finding No. 19, Cause No. 86–212–C(4).

*Primary Examiner*—David Scherbel
*Assistant Examiner*—Patrick F. Brinson
*Attorney, Agent, or Firm*—Jerome A. Gross

[57] ABSTRACT

Rectangular sheet metal duct sections with integral outwardly-and-rearwardly formed end flanges are conventionally made from coiled strip metal to lengths provided by the width of the coil stock, ordinarily slightly less than five feet. As is common practice, outward-and-reverse facing flanges are formed on both ends of each wall of the duct section. The spaces between the flange ends at the corners of the duct section are filled by heavier cornerpieces having arms projecting at right angles. Crimping the outstanding flanges over the corner arm portions completes a duct section. According to the present invention, a linear array of embossed surface portions is formed in the duct wall close to each outwardly projecting flange portion and beneath its reverse-facing portion. Manually inserting and pressing the cornerpiece arms to lodge their inner edges between the line provided by these embossed portions and the adjacent first flange portions, supports each cornerpiece in its position for subsequent crimping thereover of the reverse flange portions.

1 Claim, 1 Drawing Sheet

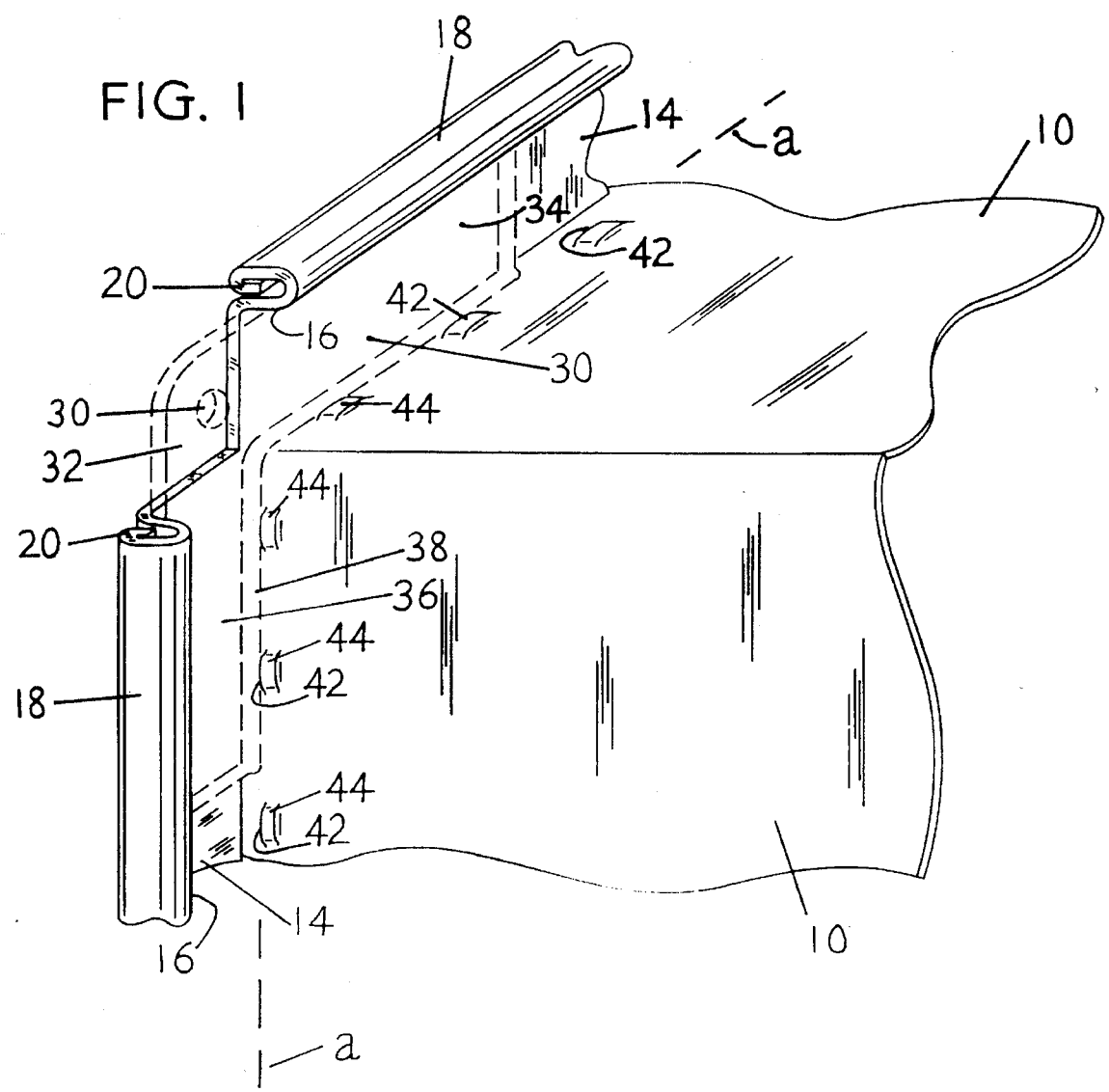

SHEET METAL DUCT CONSTRUCTION PROVIDING PRELIMINARY SUPPORT FOR CORNER CRIMPING

CROSS-REFERENCE TO RELATED APPLICATIONS

This application is a continuation-in-part of Ser. No. 126,491, filed Sep. 24, 1993, now U.S. Pat. No. 5,358,013.

This invention relates to short rectangular sheet metal duct sections having outwardly-bent integral end flanges joined by heavier right-angle cornerpieces. The invention provides means for preliminarily supporting the duct cornerpieces in position prior to crimping, in a safe and labor-saving manner.

BACKGROUND OF THE INVENTION

Duct sections for ventilating ducts are conventionally made with their four sides being continuous, each side having an end flange portion bent outward at a first 90° bend and with at least a second 90° bend back parallel to the duct surface. My co-pending application provides two additional flange portions; a spaced-apart third bend at 180° to the second, and a fourth 180° bend, (the narrow margin of material extending to the edge of the sheet) projected inward between the second and third flange portions. This construction presents no edge on which a workman might cut his hands; hence requires no special care to avoid injury.

Insertion, positioning and crimping of cornerpieces at the four corners at each end of a duct section, has required time and care. To manually position each of the right-angle cornerpiece arms, and hold it in place while crimping, and repeat this operation for each corner at each end of the duct section, slows the entire manufacturing process.

SUMMARY OF THE INVENTION

The purpose of the invention is to speed the corner-assembly operation without endangering the workman's hands, by providing a construction in which cornerpieces (and intermediate reinforcing bars, if used) are inserted by hand beneath the second flange portion and against the first, to pass over and lodge against a linear array of shallow-embossed locators on the duct surface, which retain the cornerpiece arms in position against the first flange portion, for crimping.

DESCRIPTION OF THE DRAWINGS

FIG. 1 is a fragmentary perspective view of one corner of a rectangular duct section of the type herein above referred to, flanged with the safety flange of my co-pending application, showing in phantom lines a conventional cornerpiece lodged in precise position for crimping, by locator provisions embossed on the duct surface.

DESCRIPTION OF THE PREFERRED EMBODIMENT

FIG. 1, here illustrated, corresponds in part with FIG. 1 of my said co-pending application, but corresponding parts in some instances bear different numbers. The present FIG. 1 shows one corner of a duct 10 utilizing embossed locators 44 embodying the present invention, which locate, prior to crimping, a simple conventional cornerpiece, generally designated 30 and shown in phantom. The portion of the duct 10 so illustrated includes integral flanges to be formed on each of the four duct surfaces at each of its ends. Preferred flanges, shown in my co-pending application, include a conventional first flange portion 14 formed outward from substantially perpendicular to the surface 10 of the duct section, and a second flange portion 16 extending substantially parallel to the duct section surface 10. The width of the second flange portion 16 must be sufficient for crimping over the outer edge of a cornerpiece arm. A third flange portion 18 is bent reversedly to the second portion, and is spaced from the second flange portion 16 not less than the thickness of the sheet metal from which the duct section is formed. A fourth flange portion 20, which is the margin of the sheet, is bent reversedly inward to its position between the third flange portion 18 and the second flange portion 16. By so positioning this margin edge inwardly, it cannot cut the hands of even a careless workman.

The duct cornerpiece 30, here shown in phantom to avoid observing the flange portion in which it fits, may be of conventional stamped construction having a central portion 32 from which its two arm portions extend at right angles, the horizontally-extending arm portion being designated 34 and the vertically-extending arm portion as 36. The corner portion 32 is pierced by a bore 33 for bolt-attachment to the corresponding cornerpiece of an adjacent duct section.

Prior to crimping, each cornerpiece 30 is preliminarily positioned so that its inner edge 38 fits against a line a—a defined by the inner edges 42 of a linear array of discontinuous embossed duct-surface portions 44 which comprise the present invention. The embossed portions 44 may be formed by die provisions which emboss shallowly and do not pierce the sheet metal nor obstruct insertion of the corner, but permit a cornerpiece edge to pass over them as mere hand pressure elastically deflects the flange.

While the drawing shows these embossed restraints 44 as having steeper and higher inner edges 42 (those edges facing the first flange portion 14), their shape may depend on preferred tooling; for example, restraints shaped like very shallow embossed truncated cones might serve to establish the line a—a while drawing the metal evenly from all angles. In ducts of conventional size, the maximum height of embossing may be no greater than $3/64$ths of an inch.

A workman may first preliminarily position all four cornerpieces at one end of the duct and then, while they are retained positioned by the present embossing, crimp them; then reverse the duct section so that its other end is presented upward, insert its four cornerpieces on their positions, and crimp them to complete the section. This avoids using one hand to hold each cornerpiece in correct position before one of its arms is secured by crimping, and then checking the positioning of the other arm while crimping it.

If the linear array is formed in the roll-forming operation which forms the flanges on the duct blank, the line 42 will extend around the four sides of the duct section. Should conventional reinforcing bars be desirably utilized between the corners on one or more sides of the ducts, such bars, of substantially the same height and thickness as the height and thickness of the cornerpiece arms, may readily be fitted and crimped within the first and second flange portions for the entire length between the ends of the cornerpiece arms.

While the four-element safety flange construction of my co-pending application is most advantageously used along with the presently disclosed embossed line of restraints 44, other flange constructions may also be advantageously used with the present invention, with time-saving and safety. Accordingly, modifications may be made from those herein described and illustrated without departing from the scope of the invention; and it is intended that all matter contained in the foregoing description or shown in the accompanying drawings shall be taken as illustrative rather than limiting.

I claim:

1. A rectangular sheet metal duct section having at each end integral outwardly bent end flanges to be joined by crimping within them right angle cornerpieces, said outwardly bent end flanges each comprising a first flange portion bent outward from and substantially perpendicular to the surface of such duct section, a second flange portion continuing from said first flange portion and bent back substantially parallel to the duct surface, and at a spacing therefrom sufficient for fitting therebetween the arm of such cornerpiece, a third flange portion of substantially the same extent as said second flange portion and being bent reversedly to said second portion and spaced therefrom not less than the thickness of such sheet metal, and a fourth flange portion bent reversedly inward from said third portion and presented substantially adjacent to an outer surface part of said second portion, said fourth flange portion constituting a margin of the sheet metal from which said flange is formed, the edge of which margin being positioned in the reverse bend between said second and third flange portion, in combination with means embossed on the duct surface for lodging such cornerpiece in position for crimping said second flange portion thereover, said means including a plurality of embossed duct wall surface portions projecting in a linear array spacedly from and adjacent to the said outward bend of said first flange portion, whereby, when the inner edge of an arm of such cornerpiece is manually pressed into position between said embossed array and against said first flange portion, such arm will be lodged in position for subsequent crimping of said second flange portion over it.

* * * * *